United States Patent

Glover et al.

[15] 3,647,972

[45] Mar. 7, 1972

[54] LOW-COST PORTABLE TERMINAL DEVICE FOR ELECTRONIC DATA PROCESSING

[72] Inventors: William T. Glover; Eugene W. Kelly, both of Atlanta, Ga.

[73] Assignee: Squaires-Sanders, Inc.

[22] Filed: Aug. 16, 1968

[21] Appl. No.: 753,130

[52] U.S. Cl. ......................179/2 DP, 340/149 A, 179/2 CA, 235/61.7 B

[51] Int. Cl. ......................H04m 11/06

[58] Field of Search ...............179/2 DP, 2 CA, 2 R, 90, 90 B; 178/79, 83, 84; 340/264, 365, 149 A, 172.5; 335/113, 114, 165, 166; 235/61.7 B

[56] References Cited

UNITED STATES PATENTS

| | | | |
|---|---|---|---|
| 3,555,201 | 1/1971 | Kuehnle | 179/90 B |
| 3,515,814 | 6/1970 | Morgan | 179/2 |
| 3,515,806 | 6/1970 | Spraker | 179/2 |
| 3,516,062 | 6/1970 | Spraker | 179/2 |
| 3,507,997 | 4/1970 | Weitbrecht | 178/66 |
| 3,505,474 | 4/1970 | Quatse | 179/3 |
| 3,492,650 | 1/1970 | Hesselgren | 179/5 |
| 3,440,357 | 4/1969 | Broekhuysen | 179/90 |
| 3,308,238 | 3/1967 | Brothman et al. | 340/163 |
| 3,400,378 | 9/1968 | Smith et al. | 340/172.5 |
| 3,381,279 | 4/1968 | James | 340/172.5 |
| 3,319,003 | 5/1967 | Prager | 179/1 |
| 3,289,083 | 11/1966 | Barr et al. | 325/59 |
| 3,062,921 | 11/1962 | White | 179/90 |
| 3,035,250 | 5/1962 | Durkee | 340/171 |
| 2,794,861 | 6/1957 | Heine | 179/99 |

OTHER PUBLICATIONS

IBM Technical Disclosure Vol. 10, No. 3 August 1967 Davis and Koepf

*Primary Examiner*—Kathleen H. Claffy
*Assistant Examiner*—Tom D'Amico
*Attorney*—Browne, Schuyler & Beveridge

[57] ABSTRACT

Low-cost portable terminal equipment for electronic data processing incorporating an array of manually positionable switches as a data selection and storage mechanism controlling a tone generator by way of a manually initiated scanner. Once it is manually initiated the scanner automatically interrogates the manually positioned data mechanism to control the emission of selected tones constituting code data via a transmitting audio couple over common carrier or private communication circuits to a utilization device such as a conventional computer facility, data recorder (card punch either local or remote, etc.). The terminal is particularly well adapted for use with a computer equipped with an audio response facility and for this purpose, an induction coupling permits reproduction of the computer response. The device is portable and may be used to communicate with a computer, data recorder, etc., from a pay telephone, for example. Consult the specification for other features and details.

16 Claims, 7 Drawing Figures

Figures 1A, 1B:
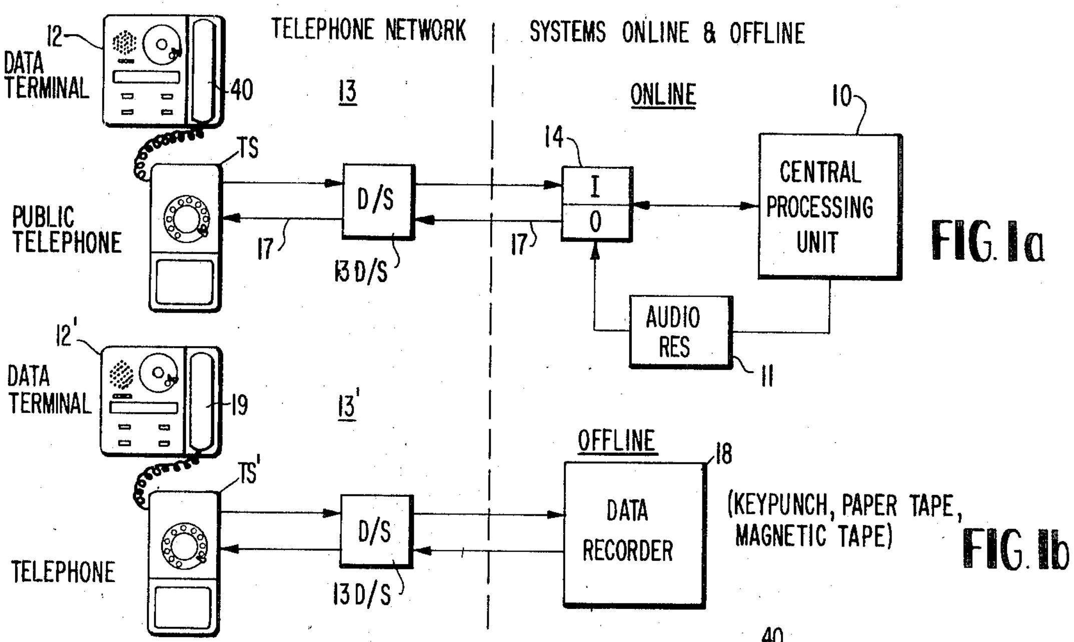

INVENTORS
EUGENE W. KELLY
WILLIAM T. GLOVER

BY

Browne, Schuyler & Beveridge
ATTORNEYS

INVENTORS
EUGENE W. KELLY
WILLIAM T. GLOVER

BY Browne, Schuyler & Beveridge
ATTORNEYS

INVENTORS
EUGENE W. KELLY
WILLIAM T. GLOVER
BY
Browne, Schuyler & Beveridge
ATTORNEYS Patented March 7, 1972

3,647,972

5 Sheets-Sheet 5

INVENTORS
EUGENE W. KELLY
WILLIAM T. GLOVER

BY Browne, Schuyler & Beveridge
ATTORNEYS

LOW-COST PORTABLE TERMINAL DEVICE FOR ELECTRONIC DATA PROCESSING

The present invention relates to a portable low-cost, reliable, general purpose terminal equipment for electronic data processing.

Every major computer manufacturer has audio response hardware in its product line. These hardwares are capable of generating human voice signals upon receipt of predetermined codes from a central computing element. Facilities have long existed for computers to control the connection of communications lines for multiplicity of purposes. In this sense, the availability of audio response is not new. To facilitate the use of audio response hardwares, numerous devices of various shapes and capabilities have been produced and are currently available. Some of these devices utilize touch-tone pads for input. It is also known to provide audio couple capabilities such that any rotary dial telephone can be connected to a computer system. Other prior art devices react to prepunched or "-badge" cards to generate codes for computer input. Facilities have also been developed such that the "response" can be recorded on tape and played back for subsequent review. Thus, it is apparent that there are a large number of terminals complementing audio response of a computer.

Applicants' research has revealed that five key areas have acted as deterents to the widespread and rapid utilization of audio response capabilities. These deterents, basically, are derivatives of deficiencies or over sophistication inherent in currently available terminal devices. These areas can be categorized as follows:

1. A high incidence of errors during data generation. Applicants' research has shown that where touch-tone pads are used for data input, error ratios from 16–30 are not abnormal.
2. Many forms of data verification are attempted in current devices. The most common form is to have the audio device repeat the data being entered. If the response is correct, the data is recorded or cancelled. Normally the techniques involved for data verification require hardwares of considerable expense. In some cases, repetitive calls are required prior to acknowledging that the proper data was received. This is uneconomical in that the user is "on-line" for considerable periods of time. The present invention does not negate the need for data verification. However, the utilization of manually actuated thumbwheel switches insures that the data desiring to be entered is "in sight" and verification is greatly simplified, i.e., as response is received, sight verification is permitted. While "in sight" verification of data entered is not, per se, novel, it is utilized in a novel way for purposes of the present invention.
3. Another problem delaying the acceptance of audio response techniques is the amount of time required to satisfy normal application requirements. Excessive time results in additional central computer expense and communications circuits costs. The present invention solves this problem by permitting the prepositioning of switches prior to establishing the connection with the central computer. Once connection is established, a faster than human readout at maximum speed can be accomplished.
4. The generation of pulses has, to date, centered around nonretrievable motor actions on the part of the sender. In most cases pulses are generated by readout of prerecorded fixed codes, e.g., in identification badges, punched cards, or manual depressions of touch-tone keys. In the present invention codes are generated dependent upon the position of selectable rotary switches. Where erroneous switch positioning occurs, only the switch or switches in error need be repositioned. This achieves significant savings in the amount of time to effect a correct transmission. And where long distance telephone lines are utilized, this results in significant monetary savings much greater that the cost of the data terminal disclosed herein. Once set, a simple motor action, on the part of the user, rotation of the rotary dial, is all that is required for retransmission.
5. Development of flexible security techniques has been difficult. Techniques prevail whereby selected codes are changed on a timely basis to insure systems propriety. The present invention permits development of unique and carefully controlled security index schemes. Not only may codes, inaccessible to the standard user, be utilized but the element of time, if desired, can be integrated as a contributory factor in the security scheme, all at low cost and without complexity or additional equipment.

The present invention provides a positive answer to these and other problem areas and, in addition, coupled with its portability and low cost, the application of computer-controlled audio response in new areas is now economically practical.

It is emphasized that although the foregoing discussion has centered around use of the data terminal of this invention with a computer having an audio response facility, the invention is not limited thereto as it may be used in connection with less complex data transmission system. For example, the terminal may be used as an input to a card punch or other data recording devices, where there would be no information feedback to the user.

Figure 3:
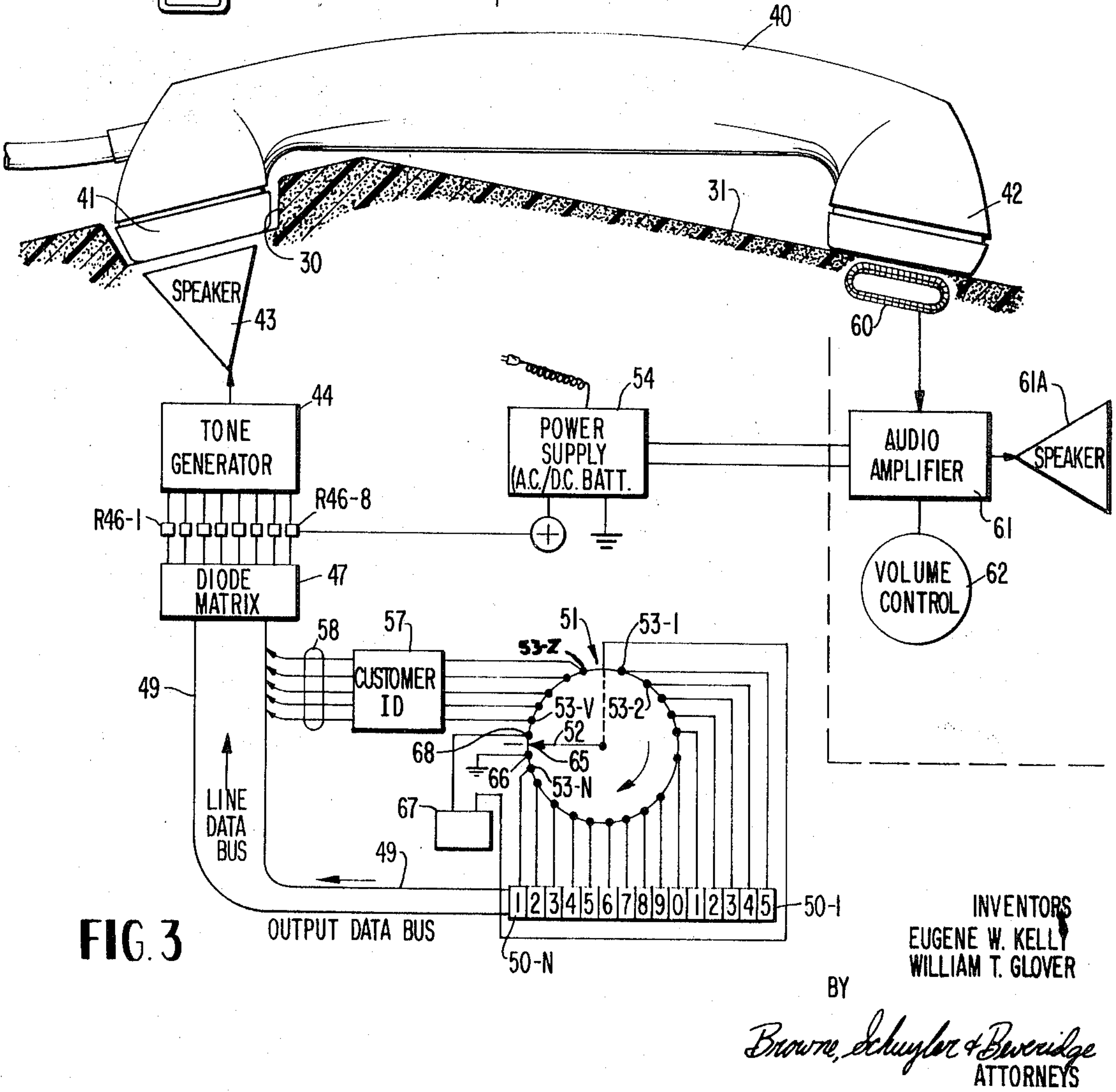
Figure 2:
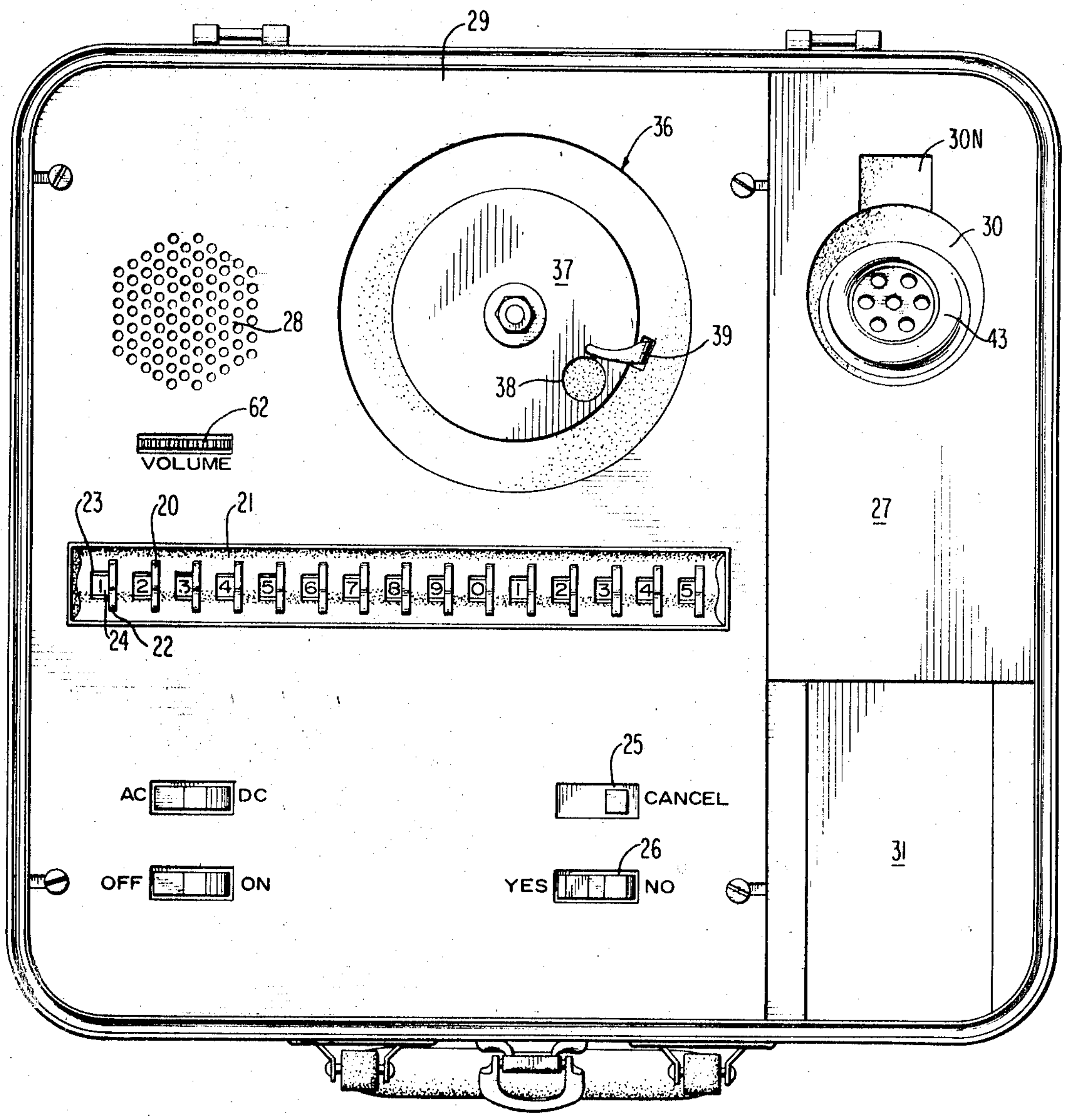
Figure 4:
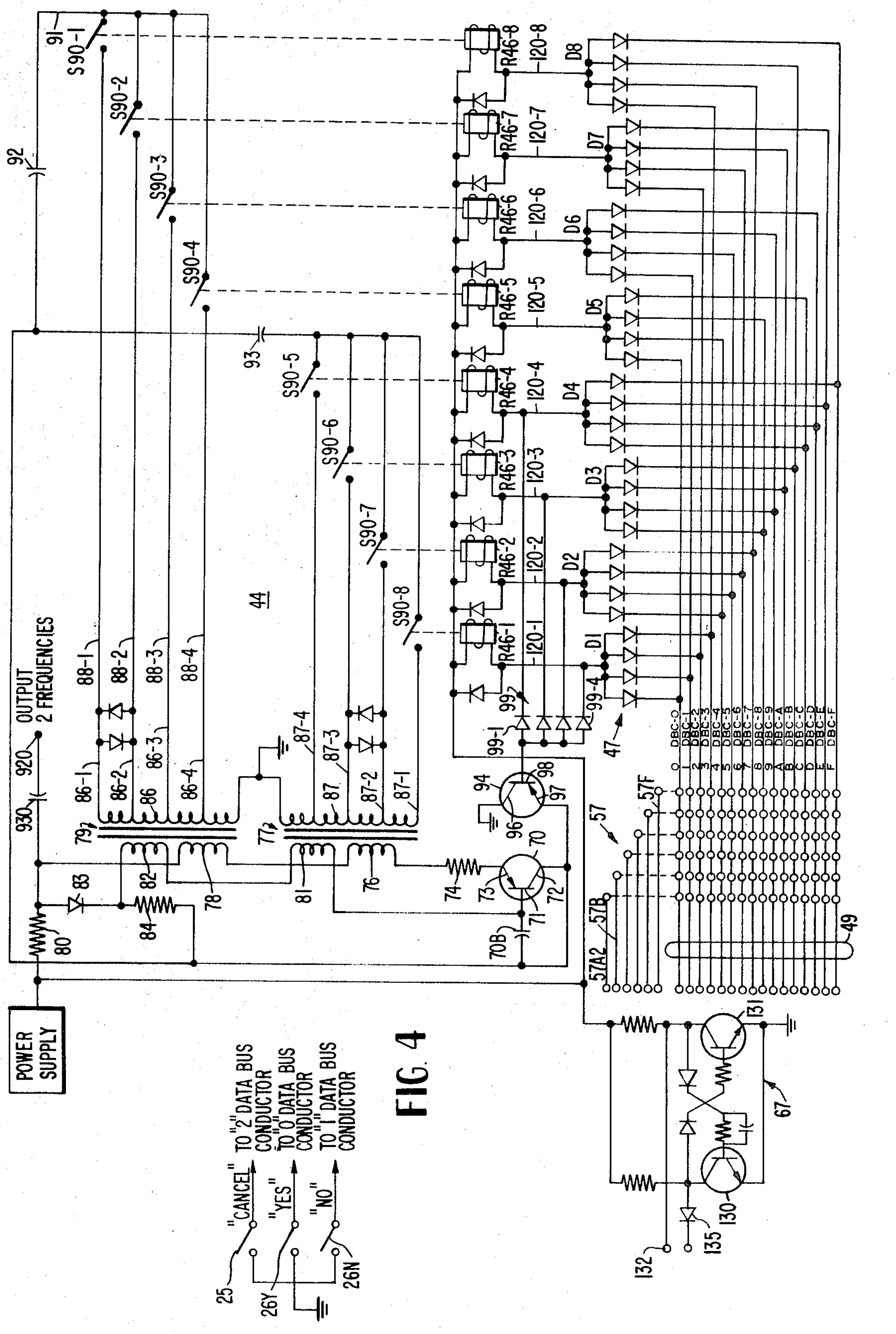
Figure 5:
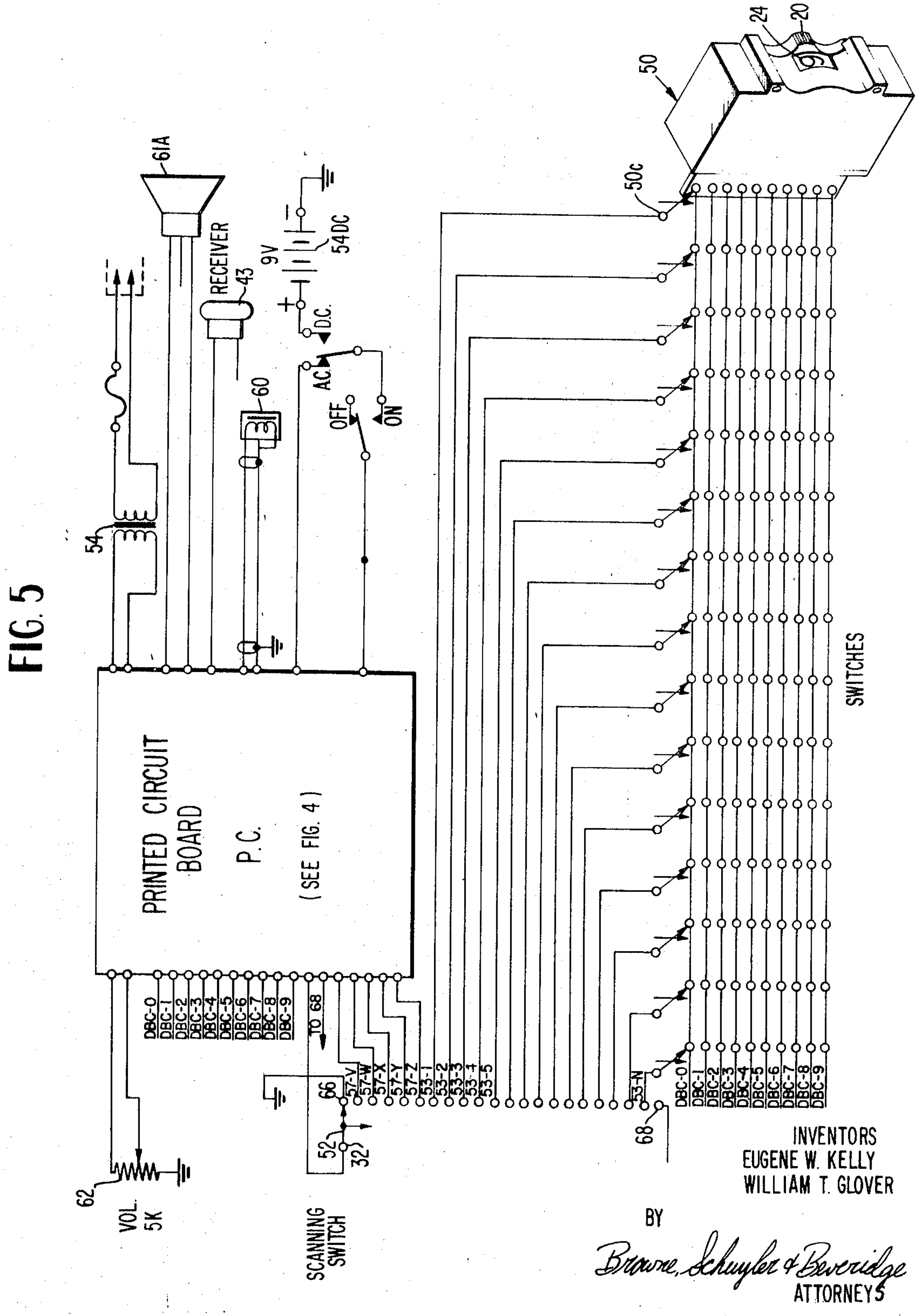
Figure 6:
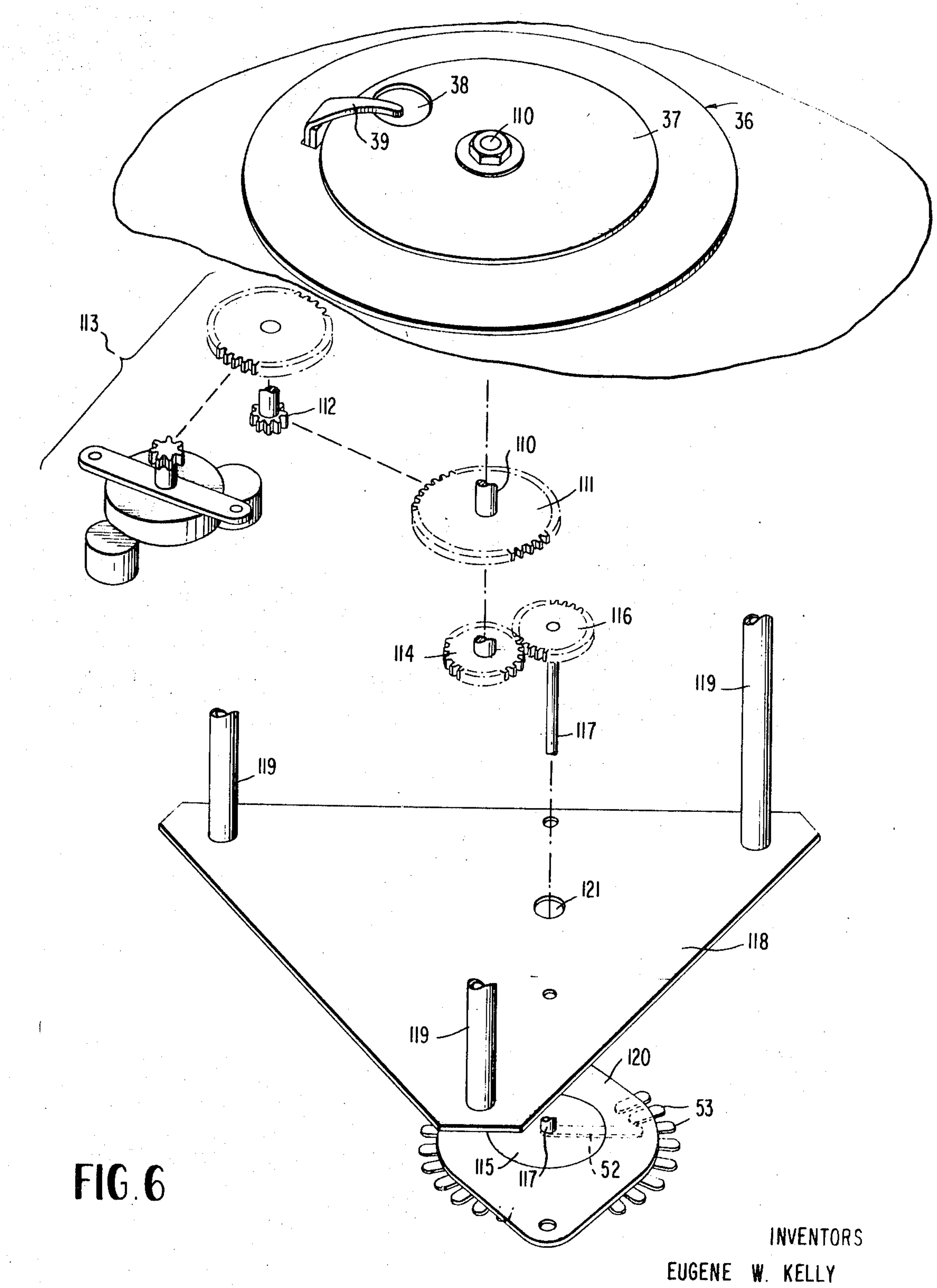

The foregoing and other objects, advantages and features of the invention will be apparent from the following description of the invention taken in conjunction with the accompanying drawings wherein:

FIG. 1*a* and FIG. 1*b* are diagrammatic block diagrams illustrating various uses of the invention, FIG. 2 is a top plan view of a data terminal incorporating the invention, FIG. 3 is a schematic and diagrammatic diagram illustrating the major components of the invention, FIG. 4 is an electrical schematic diagram of a data terminal incorporating the invention, FIG. 5 is a schematic diagram illustrating the connection of the manual rotary selection and storage switches to the data bus and a printed circuit board and appurtenances thereto, and FIG. 6 is an exploded view of a manually initiated scanner mechanism incorporated in the invention.

GENERAL DESCRIPTION

The invention will be described primarily in connection with a conventional computer facility having an audio response capability as illustrated in FIG. 1*a*. FIG. 1*a* is a functional block diagram of computer facility 10 having audio response unit 11 it being understood that many more lines may be used in conjunction with this system on a time sharing basis. Full details of this system may be found in the publication under the IBM Systems Reference Library File No. S360–19, A27–2706–0, entitled "Original Equipment Manufacturer's Information." The audio response unit 11 of the IBM system provides access to stored data of a computer system and provides data to the user as audible or audio messages or spoken words in response to digital inquiries. In general, the response unit 11 acts as an interface with the computer and interprets the inquiry from a remote data terminal 12 and composes a response message, translates the message into verbal form and transmits it to the inquiring party. Vocabulary for such machines are stored on a data drum and the voice response is composed therefrom. In FIG. 1*a* a series of telephone sub sets TS (only one being shown) are connected through telephone network 13 which may include at the computer facility conventional and currently available data sets 13 D/S, any one of which may be used provided the signals selected through the switches thereof are consistent with its receiver's (e.g., the computer) requirement. At the computer facility is a conventional audio response unit 11, such as the IBM 7770 audio response unit. Movement of incoming inquiries from remote telephone units to the data processing system may be via a standard input output interface system 14 such as a standard IBM system 360 I/O interface. A transaction is initiated by lifting the telephone receiver handset 40 at a remote station 12, subset TS and dialing the number of the computer facility. If any telephone line answers or responds to calls made to that number or the line is not busy, and if the line has been previously enabled, an inquirer hears a ready tone about 5 seconds in length which indicates that the computer facility has answered his call. The computer is informed that a transaction has been started and the channel responds with a "read" command. An inquiry or other data is then transmitted by the user from terminal 12 and a control unit (not shown) requests service in the computer facility. If data is not received within a certain time period after the read command is used, the control unit terminates the command, the channel interrupts the processor and the processor terminates the call so the user must reestablish connection with the computer facility as described. If the data is accepted and the user does not hang up, it is transferred to processor core storage. This operation continues until the data terminal 12 stops entering data as determined by a certain time period or end of data received. The processor analyzes the data inquiry and formulates a response message (if one is necessary or desired) in the form of a sequence of addresses to a storage drum. A multiplex device (not shown) identifies the telephone line requiring the response, and forwards it (one word address at a time) to the control unit and for each address sent, an audio word (or a portion thereof) is gated into this line, and fed through the output of the control unit to the line being used along the response arrows 17.

The above description of the interrogation of the computer and the processing and storage of incoming calls to the computer is taken substantially from the IBM Systems Reference Library publication entitled "Original Equipment Manufactures Information IBM 7770 Audio Response Unit Model 3, IBM 7772 Audio Response Unit," IBM Library Reference Form H 2712–0.

On pages 12 and 13 of the IBM Systems Reference Library component description IBM 7770 Audio Response Unit Model 1, 2, and 3, Form A27–2712–0, first edition 1966, are disclosed a plurality of various data terminals for interrogating the computer and it is with respect to this portion of that system that the present invention is concerned. As there disclosed, auxiliary pushbutton manual dialing devices, auxiliary pushbutton automatic dialing devices, rotary dial automatic dialing devices having auxiliary pushbutton manual dialing devices, pushbutton manual devices, telephones, pushbutton automatic dialing telephones, data transmission terminals coupled with a data set, punched card dialing telephones, all of which are for the purpose of providing communication between a remote computer facility and any number of remote telephone systems via a common communications facility such as a telephone network. The present invention constitutes an improvement over such remote terminal units.

FIG. 1*b* is a diagrammatic illustration of "off-line" use of the invention in connection with a simple data storage unit 18 which may be a keypunch, paper tape, magnetic tape, etc., tone signals from data terminal 12′ being coupled to the telephone network 13′ by the telephone handset 19.

Details of the data terminal 12 are shown in FIG. 2 which is a top plan view of the device with the cover of its carrying case removed. As shown a row of thumbwheel operators 20 for manually positionable data selection and storage switches project outwardly from slots 22 in mounting plate 21 which has a cut out or window 23 to expose indicia wheel 24 associated with each manually positioned data selection switch and storage thumbwheel 20. As will be apparent, indicia wheel 24 may have numbers or letters of the alphabet thereon as desired. (While the invention is described in connection with a two out of eight bit code so that only 16 code permutations are available, it may be applied to code systems having sufficient permutations to encompass any alphanumeric data.) Thus, any data to be transmitted is always presented to the user for verification before and after a communication link has been established with the utilization device. The communication link may be established by conventional dialing of the telephone number assigned to such utilization device and placing the telephone handset on the "cradle" 27 of the data terminal. When the utilization device is a computer facility equipped with an audio response unit, and is programmed to repeat back the data transmitted by the data terminal by voice signals issuing from a speaker behind a grille or perforations 28 in cover 29, the user is able to verify that the data has been accurately or inaccurately received by the computer facility and send a signal by the "yes-no" switch 26, for example, or to send a signal to the computer facility to "cancel" the transmitted data by actuation of "cancel" switch 25. As described later herein, switches 25 and 26 are connected to the generator to cause the generator to generate signals which advise the computer facility of the accuracy of the transmission, etc.

Cradle 27 is formed from a mass of sound absorbing material such as polystyrene foam and has a cavity or recess 30 for snugly receiving the mouthpiece of a telephone handset (not shown in FIG. 2) to form a audio couple and exclude ambient sounds from causing transmission of false or spurious signals to the utilization device. Notch 30N receives the cord to the telephone handset. A planar surface 31 extending away from mouthpiece cavity 30 has mounted therein an induction device where the earpiece of the telephone handset rests for detecting audio signals from the computer or a party at the utilization device, which is amplified and applied to the speaker behind grille 28.

To the right of grille 28 is a scanner actuating mechanism 36 (described in greater detail in connection with FIG. 6) which in a preferred embodiment is plate 37 having a single fingerhole 38 and a finger stop 39. After the communication link to the utilization device has been established, plate 37 is manually rotated to finger stop 39 and released which effects transmission of the data previously entered and stored by the positions of thumbwheel 20, to the utilization device.

At the same time, and preferably prior to transmission of data stored by the thumbwheel switches, a unique code word or identification characters assigned to the data terminal is also transmitted to the computer. The purpose of this is to preclude unauthorized use of the computer. This is preferably accomplished by internal wiring so that such unique code is always transmitted by the data terminal irrespective of the desire of one having possession of the data terminal. Although the code may be established by a separate device such as a punchcard, or by additional switches on the face of the instrument, for many applications it is preferred that such identification code be inaccessible to a possessor of the data terminal. While the feature of having the unique code established by internal wiring is less flexible than others referred to herein, it does provide a form of positive control over access to the computer facility.

FIG. 3 is a functional block diagram disclosing a terminal incorporating the invention. In FIG. 3 a conventional telephone handset 40 having a transmitter portion 41 (mouthpiece) and receiver 42 (earpiece) is placed on handset receiver or cradle 27 with transmitter portion 41 in snug abutment with transmitter cavity or fitment 30 and with receiver 42 on receiver surface 31. Transmitter cavity 30 contains a speaker 43 which is electrically connected to and energized by a signal or tone generator 44 when the generator has been conditioned for operation as described more fully hereinafter. Tone generator 44 generates tone signals in selected digital data code patterns in accordance with energization of code relays R46–1 to R46–8. Relays R46–1 through R46–8 are selectively energized in accordance with the output of a diode matrix 47 and coact therewith to decode the information supplied thereto by data bus 49 and translate same into code patterns. Selected conductors of data bus 49 receive potential according to selected digital data code patterns set up by a plurality of manually positionable rotary data selection and storage switches 50–1 through 50–N in a manner to be described more fully hereinafter. For present purposes however, it is sufficient to note that rotary thumbwheel switches 50–1 . . . 50–N are set manually in accordance with data to be transmitted to the utilization facility. These data selection devices are scanned sequentially by a manually actuated commutator 51 which has a rotatable switch arm 52 which is swept along a bank of linearly or circumferentially disposed fixed contact elements 53–1 through 53–N to supply sensing potential from a power supply 54 to each rotary thumbwheel switch in 50–1 through 50–N in sequence whereby selected lines of data bus 49 are energized with potential from power supply 54 according to the rotary position of thumbwheel switches 50–1 to 50–N. Commutator switch arm 52 also scans in sequence a set of fixed contact positions 53–V through 53–Z which are coupled to a user identification and security matrix unit 57 which is likewise coupled to data bus 49 by a user security bus 58.

Receiver surface 31 mounts an induction coil 60 which transduces sound energy produced in receiver 42 into audio electrical energy which is amplified by an amplifier 61 whose output is coupled to a speaker 61A for presentation to the user. Audio amplifier 61 may have a volume control 62 for adjusting the gain of amplifier 61 so that the volume output of speaker 61A may be adjusted to suit the convenience of the user. Audio amplifier 61 as well as all other electrical components disclosed herein receive their power from an AC/DC power supply and battery 54. The battery may be rechargeable and have a battery condition indicator (not shown) so that the unit may be used to communicate with a computer from a telephone booth, for example. With reference to FIG. 3 the scanning commutator switch arm 52 is shown in a stop position and is manually rotated counterclockwise to load a spring governor motor (described later herein) so that for transmission of data the commutator contact position 53–V is first scanned by commutator switch arm 52 to transmit a code identifying the data terminal and subsequently the contact switch position 53–N is the last to be scanned to transmit data. As shown later herein, switch arm 52 actually supplies ground to the contact elements scanned thereby, but any equivalent arrangement may be used.

Two further fixed contact positions 66 and 68 are included for the purpose of controlling an electronic latch or lockout circuit 67 which prevents generation and transmission of signals by generator 44 if the plate 37 has not been fully rotated to stop 39. It will be noted that contact element 66 is at one side of the rest or stop position 65 and contact 68 is at the other side of the rest or stop position. On initial movement of switch arm 52 to engage contact element 66, latch circuit 67, which is a bistable circuit, is switched to one state which, in effect disables generator 44. Contact element 68, when engaged by switch arm 52 is effective to cause latch circuit 67 to switch states. Hence, as switch arm 52 engages contact elements 53–N, etc., no signals are generated or transmitted, but upon switch arm 52 contacting contact element 68, generator 44 is enabled or energized so that on release of plate 37 by the user, and return thereof to the start position, data is transmitted. As noted earlier, switch arm 52 supplies ground to each of contact positions on the scanner, and this ground is effective through circuitry described later herein to effect transmission of data by generator 44. Latch circuit 67 is operated so as to prevent switch arm 52 from supplying ground unless switch arm 52 has been translated a sufficient distance to assure that the first contact position is scanned first so as to prevent partial or inaccurate data transmission and also assures transmission of the unique code pattern identifying the terminal.

FIG. 4 is a circuit diagram of the signal generator 44, the relay control circuitry therefor and the decode matrix 47 illustrated generally in FIG. 3. With respect to FIG. 4, the tone generator includes dual tone oscillator transistor 70 having base electrode 71, collector electrode 72 and emitter electrode 73, the frequencies of oscillation thereof being established through selective inclusion or exclusion of reactances by relays R46–1 to R46–8. Specifically, emitter electrode 73 is connected in series with a precision resistor 74 (of small value), winding 76 of transformer 77, winding 78 of transformer 79 and through resistor 80 to the source of operating potential such as a 9-volt battery. Base electrode 71 of transistor 70 is connected through winding 81 of transformer 77 which is in series with winding 82 of transformer 79 to the junction of the anode connection of diode 83 to resistor 84. Diode 83 and resistor 84 provide bias to base 71 of transistor 70 to maintain operation of the transistor on the linear portion of its load curve and base capacitor 70B enhances starting of the oscillator.

The multitap winding 86 of transformer 79 has the lower side thereof connected to the ground or common along with the multitap winding 87 of transformer 77. Each tap 86–1 through 86–4 of winding 86 is connected by conductors 88–1 through 88–4 through switch elements S90–1 through S90–4, respectively, to a common terminal 91 so that different amounts of inductance are connected in circuit with capacitor 92 to alter the operating frequency of transistor oscillator 70 for one frequency range. A similar circuit is provided for taps 87–1 through 87–4 and relay switch elements S90–5 through S90–8, respectively, and capacitor 93. These two resonant circuits are actually connected in parallel with each other so as to establish the coded output frequencies, according to which of relay switches S90–1 through S90–8 (which may be operated singularly or in multiples) are actuated by their respective relays R46–1 through R46–8. Except for reed relays 46 operating relay switches 90, the oscillator circuit is substantially similar to the standard tone generator as used by commercial telephone companies, and hence need not be described in greater detail. The output of this generator appears at terminal 920 through a coupling capacitance 930 and consists of two frequencies in code permutations determined by which of relays R46–1 to R46–8, have been energized.

Transistor 94 is switching transistor and has its collector emitter circuit 96–97 connected between ground and the collector electrode 72 of transistor 70. This transistor is normally nonconductive and is rendered conductive by the application of a potential to its base electrode 98 through the OR-circuit 99 constituted by diodes 99–1 to 99–4 so that whenever any one of relays R46–1 through R46–4 are energized, there is a potential on the base electrode 98 of transistor 94 rendering this transistor conductive and thereby rendering oscillator transistor 70 operative. In the absence of any signal (i.e., a ground via one of diodes 99, one or more of diodes in diode sets $D_1$, $D_2$, $D_3$, $D_4$, data bus 49 and switch arm 52) on base electrode 98 of transistor 94 the oscillator circuit is not operative and no tone signals are generated. It will be apparent that transistor 94 may be eliminated in which case the collector 72 of transistor 70 would be connected directly to the anodes of diodes 99. While a degree of isolation of the oscillator circuit is removed by this modification, it may be employed where desired.

The cathodes of the diodes in diode sets $D_1$, $D_2$ . . . $D_8$ are connected to the 16 conductors DBC–0, DBC–1, DBC–2 . . . DBC–F of data bus 49 in accordance with a standard pattern so that each digit bus conductor is connected to the cathodes of at least two diodes, any one diode in diode sets $D_1$, $D_2$, $D_3$, and $D_4$ and any one diode in diode sets $D_5$, $D_6$, $D_7$, and $D_8$. In this way permutative energization of reed relays R46–1 . . . R46–8 is effected which, in turn, effects generation of any two out of eight selected frequencies of the code utilized.

As a specific example, suppose a given data selection and storage switch is set to exhibit the number "9." When switch arm 52 is scanning the given data selection and storage switch having this number set therein (See FIG. 5), ground is supplied to data bus conductor DBC–9 through the data selection and storage switch. (In FIG. 5 the row of vertical arrows crossing a slanted arrow is a symbolic designation of a connection through a data selection and storage switch to any one of the data bus conductors shown according to the rotary position of such switch. It is also noted that data bus conductors DBC–A to DBC–F are not shown in FIG. 5 as these are for transmitting other than numerical characters.)

Ground on data bus conductor DBC–9 places a ground on the cathodes of a diode in diode set $D_3$ and a diode in diode set $D_8$. This in turn completes a circuit through the energizing windings of reed relays R46–3 and R46–6, respectively, to the source of operating potential for all the relays. Energization of reed relays R46–3 and R46–6 closes relay switches S90–6 and S90–3, respectively to thus connect that portion of multitap winding 87 between tap 87–3 and ground in a resonant circuit with capacitor 93, and that portion of multitap winding 86 between tap 88–3 and ground in a resonant circuit with capacitor 92 to establish the two code frequencies transmitted for the number "9."

If the utilization facility is a computer provided with an audio response unit as described earlier herein, data received at the facility may be repeated back to the data terminal in voice form and as it is "spoken," the user may be sight verify accuracy of data now stored at the computer by observing the indicia wheel 24 at each switch position. If the data was accurately received at the computer facility, the user may depress "yes-no" switch 26 to the "yes" position. This will supply a momentary ground on data bus conductor DBC–0 (switch 26Y in FIG. 4) which is a signal to the computer to proceed. In the event the data was incorrectly received at the computer facility, the user may depress "yes-no" switch 26 to the "no" position. This will supply a momentary ground on data bus conductor DBC–1 (switch 26N, FIG. 4) which is a signal to the computer that the data received was incorrect. If the user has incorrectly entered the data as shown by the indicia wheels of the data selection and storage switches, he simply resets the incorrect data switch or switches and reinitiates the cycle at the direction of the computer, for example. In order to cancel previously sent data, the terminal is provided with a "cancel" switch 25. "Cancel" switch 25 is connected to data bus conductor DBC–2 and supplies a momentary ground to data bus conductor DBC–2 to transmit tone signals corresponding to a "2" which, like the "yes-no" signals, are arbitrarily selected as computer advisory signals or tones.

As shown in FIG. 6, the manually initiated scanner mechanism 36 includes plate 37 secured to shaft 110 which is journaled for rotation about the axis thereof by bearings (not shown). Plate 37 has a single fingerhole 38 and a cooperating conventional fixed stop member 39. Gear 111 is secured to shaft 110 and is meshed with gear 112 of a conventional spring governor motor assembly 113 which is similar to types found on conventional telephone dials. While the governor, which is a part of the scanning mechanism, is of conventional construction, it is designed to accommodate the number of positions to be scanned such that the scan rate approximates but does not exceed receiving equipment limitations. As shown, clockwise rotation of plate 37 and gear 111 energizes or loads spring governor motor assembly 113 so that upon release of plate 37 by the user, spring governor motor assembly 113 rotates shaft 110 in the opposite or scanning direction. However, as described elsewhere herein, unless plate 37 has been rotated to where the user's finger engages stop 39, there will be no actual transmission of data because of the latch or lockout means.

Also mounted on shaft 110 is gear 114 which is meshed with gear 116 on switch arm shaft 117 which, in turn is mounted for rotation in plate 118. Spacer rods 119 support plate 118. The lower end of shaft 117 is secured to a disc carrier 115 for switch arm 52.

Contact carrier 120 is secured by screws (not shown) to plate 118 and shaft 117 passes through aperture 121 with the lower end of shaft 117 being connected in driving relation to switch arm 52 (FIG. 3). Contact carrier has N+2 contact positions, with the first and the last being used to set and reset the electronic latch circuit 67 as described earlier herein. The operation of the contact carrier 120 and switch contact arm 52 in the scanning phase of contact positions intermediate the first and last contact positions is to provide an electrical path between the common contact constituted by the rotary switch arm 52 and each fixed contact position in sequence. The fixed contacts 53 are connected such that the validation or terminal identification code set up at contacts 53V–53Z (FIG. 3) by either unique internal or "hard" wiring indicated at 57 of FIG. 4 or by a punched card (not shown) arrangement of connecting selected ones of conductors 57A–57F (FIG. 4) to selected ones of the data bus conductors. It will be apparent that where identification of the data terminal or user is not necessary, this feature may be eliminated or simply not used.

Data entered into the terminal at the thumbwheel switch operators 20 is scanned or read in sequence by application of a pulse (e.g., grounding) by switch arm 52 at the common terminal 50C of each thumbwheel switch 50. Such switches are well known in the art and described in detail in Lien U.S. Pat. No. 3,306,993 and are effective to convert the position of the thumbwheel operator, e.g., the digit illustrated in the window 23, to a selected energization of one of the conductors, corresponding to stored digit, on data bus 49. The outputs of the thumbwheel switches are bused together (FIG. 5) so that it is only necessary to wire one set of digit lines or conductors to decode matrix 47.

As noted earlier decode matrix 47 comprises a plurality of diode sets $D_1$, $D_2$ . . . $D_8$ which converts or decodes the 16 possible input characters into the standard two-out-of-eight transmission code, but other known transmission codes may be used to accommodate a larger number of input characters. Thus, there are four diodes per set making a total of 32 diodes in the decode matrix 47 and eight output lines 120 from the matrix and in each line is the operating coil of isolation reed relay 46, each coil having a conventional suppression diode connected in shunt therewith. These reed relays serve to isolate the oscillator circuit from the remainder of the circuits and hence eliminate any interference from changing characteristics such as contact resistance in the scanner, etc. Further, since the oscillator is a tuned circuit and lead lengths affect operating characteristics, the isolation reed relays make uniform this aspect and serves to improve the reliability and life of the device.

As noted earlier, an "OR" circuit constituted by diodes 99 sense the presence of a signal on any one of the conductors 120–1 to 120–4 to operate transistor 94 and insure against transmission of spurious tone signals.

The electronic latch circuit 67 is composed of a pair of transistors 130 and 131 (FIG. 4) connected as a bistable multivibrator circuit so that in a quiescent condition transistor 131 is normally nonconducting or "off" and transistor 130 is normally conductive or "on." As described earlier the first and the last scanner switch positions 66 and 68 are utilized to control the action of latch circuit 67. One side of scanner switch arm 52 is connected to ground through grounded scanner switch position 66 (see FIG. 5) and the other side of scanner switch arm 52 is connected to the collector electrode of transistor 131 via terminal 132, thus placing ground on the collector of transistor 131. As soon as scanner switch arm 52 is moved off of contact 66 in a direction to energize spring governor motor 113, ground is removed from the collector electrode of transistor 131. However, since there has been no input signal to change the state of the bistable circuit, it remains in that condition during traversal of the scanner contact positions intermediate the first and the last. Contact element 68 is connected to the collector electrode of transistor 130 through a decoupling diode 135 so that as soon as scanner switch arm 52 contacts contact element 68, a signal is applied to transistor 130 to cause the bistable circuit to switch states, e.g., transistor 130 ceases to conduct or goes "off" and transistor 131 conducts or goes "on" to reground scanner switch arm 52 through transistor 131. As soon as scanner switch arm 52 completes the scanning of the intermediate switch positions and contacts contact element 66, latch circuit 67 has an input which causes it to switch states again to place the circuit in condition for a further operation.

It will be appreciated that the scanner switch contact element 53 may be replaced by other types of switches, as for example, by a bank of reed-type switches actuated by a magnet translated past the switches. Moreover, the drive mechanism for switch arm 52 may be such that during energizing of spring governor motor 113 by manual rotary movement of plate 37, shaft 117 may be disengaged until a complete loading of the spring governor motor has occurred in which case movement of switch arm 52 or its equivalent will be unidirectional and the feature of disabling the scanning function and energization of the generator during the manual initiation of the scanning or readout function will not be utilized.

Since the "cradle" 27 is essentially single ended in that only the transmitter portion 41 of a handset need by positioned in cavity 30 and the receiver portion 42 of the handset need only be close to induction pickup 60, the device is adapted for use with various sizes and styles of handsets which may be encountered by most users.

It will be apparent from the above description that this invention meets the objectives thereof in providing a portable, low-cost, highly reliable data transmitter which, while being disclosed in the environment of a computer having audio response capability, is nevertheless well adapted for other uses. While the invention disclosed herein has been described in detail, it will be obvious that the invention is not limited thereto but is capable of being embodied in many forms, some of which have been referred to hereinabove.

Various other changes and/or modifications which will suggest themselves to those skilled in the art may be made without departing from the scope of the invention.

What is claimed is:

1. A portable data terminal for transmitting data via a telephone line communication link to a utilization facility comprising, in combination, generator means for generating tone signals, corresponding to digital data code patterns, and transmissible over said telephone line communication link, coupler means for coupling said generator means to said communication link, said coupler means including audio transducer means for translating electrical tone signals generated by said generator means to acoustic energy and means for receiving the mouthpiece, of a telephone handset and coupling audio energy from said audio transducer to said mouthpiece to the exclusion of extraneous audio energy, means for entering data into the terminal including an array of manually positionable input data selection and storage switches for controlling said means for generating, each of said manually positionable input data selection and storage switches includes an operator member, an indicia display member and an indicia viewing window, whereby the data stored at each data selection and storage switch in said array is visible to the user, means electrically coupling said input data selection and storage switches to said means for generating, including a manually initiated scanner means for sequentially scanning said array of manually positionable input data selection and storage switches in sequence from the first to the last to sequentially supply an energizing signal to said switches, and a diode matrix means for converting the output of said data selection and storage switches to a digital code, whereby, as said scanner means scans, each data selection and storage switch is supplied in sequence with an energizing signal to produce a digitally coded output signal from said diode matrix, said means for generating signals receivers said digitally coded output signal and generates a data code pattern corresponding to a data code pattern established by the position of said data selection and storage switch which is translated to acoustic tone signals by said audio transducer and coupled to said mouthpiece.

2. The invention defined in claim 1 including means for disabling said generator in the absence of a data code pattern established by said manually positioned switches.

3. The invention defined in claim 1 including manually operated independent nonstorage switch means connected to said generator for causing said generator to generate a code pattern independent of the scanning of said manually positionable input data selection and storage switches.

4. The invention defined in claim 1, including identification means connected to said generator means by said scanner means for causing said generator to generate a unique code pattern identifying said portable terminal to said utilization facility, and wherein said means electrically coupling said input data selection and storage switches to said generator means includes a plurality of conductors constituting a data bus, and including said diode matrix converting the output of said switches to a digital code, said identification means connected to said generator comprising a plurality of identification conductors connected to selected ones of said data bus by a set of wired conductors and in a pattern unique to the data terminal whereby said unique code pattern identifying said terminal is always transmitted to said utilization facility.

5. A portable data terminal for transmitting and receiving data via telephone lines, the data terminal defined in claim 1, wherein said utilization facility includes means for transmitting audio signals to said data terminal via said telephone line to the earpiece of said telephone handset, said portable terminal including means for receiving the earpiece of said telephone handset and transducer means for converting signals, detected in said transducer by the earpiece of said handset to audible sound energy.

6. The invention defined in claim 5 including a self-contained electrical power supply for supplying electrical energy to said generator means, said audio transducer means and said means for translating.

7. A portable data terminal for communicating with a data utilization facility via a telephone line comprising, in combination, a tone generator for permutatively generating tone signals in selected permutated data code patterns, an array of manually positionable rotary electrical data selection and storage switches, each switch having an operator member and a data display means so that selected stored data is visible to the user, scanning means for sequentially scanning said array of manually positionable data selection and storage switches in a sequence from the first to the last, a diode matrix means coupling said array of data selection and storage switches to said generator to cause said generator to sequentially generate permutated signal patterns according to the position of said data selection and storage switches, manually actuated means for initiating operation of said scanning means after manual positioning of said data selection and storage switches, and means coupling the output of said tone generator to said telephone line coupled with said utilization facility whereby as said scanning means scans said rotary data selection and storage switches the position of each switch is converted to corresponding tone signal patterns and transmitted to said utilization device via said communication link.

8. The invention defined in claim 7 wherein said scanning means includes a commutator having a rotor member, spring-motor means loaded upon movement of said manually operated means for effecting movement of said rotor member at a selected fixed speed whereby said commutator means scans said manually positioned data selection and storage switches at said selected fixed speed.

9. The invention defined in claim 8 including means for preventing transmission of data from said manually positioned switches unless said rotor member has been moved a predetermined angular distance.

10. The invention defined in claim 7 including manually actuated independent switch means connected to said multitone generator through said diode matrix for causing said generator to generate a code pattern independent of said data selection and storage switches.

11. Apparatus for sequentially commutating a plurality of input data devices to a utilization device comprising a shaft journaled for rotation about its axis, a single fingerhole disc means for manually rotating said shaft in one direction a predetermined angular distance from a rest position,
a finger stop member spaced from said rest position said predetermined angular distance,
spring motor-governor means coupled to said shaft and loaded during movement of said shaft in said one direction for mechanically returning said shaft to said rest position,
a plurality of switch elements, each of said switch elements being connected to one of said data input devices, respectively,
a rotary member driven by said shaft,
a switch-actuating element driven by said rotary member momentarily actuating each of said plurality of switch elements in sequence to connect said switches to said utilization device in the sequence scanned, and
a latch circuit connected to said first of said plurality of switch elements and actuated to one condition by said switch-actuating element with said first of said plurality of switch elements and actuated to another condition upon engagement of said switch element with the last of said plurality of switch elements,
utilization device disabling means connecting said utilization device so as to render said utilization device inoperative upon said wiper momentarily engaging the said first of said plurality of contact elements in movement from said rest position and operative upon said wiper element engaging the last of said plurality of contact elements upon complete movement of said shaft in said one direction through said predetermined angular distance to said finger stop member,
whereby contact elements intermediate the first and the last of said contact elements are rendered ineffective on movement of said shaft to said predetermined angular position and said contact elements intermediate said first and said last contact elements being rendered effective only on said wiper element engaging the last of said contact elements and rendered operative only on the return movement of said wiper element to return position by said spring motor-governor means.

12. The invention defined in claim 11 wherein said utilization device disabling means includes,
means for disabling said utilization device on initial movement of said rotor member in a predetermined direction from a rest position, and
means for enabling said utilization device on movement of said rotor member in said one direction said predetermined angular distance in said predetermined direction.

13. The invention defined in claim 11 wherein said utilization device disabling means includes
an electronic latch circuit,
means operated on initial movement of said rotor member from a rest position for causing said latch circuit to disable said utilization device, and
means operated on movement of said rotor member said predetermined angular distance for causing said latch circuit to enable said utilization device.

14. The invention defined in claim 1 wherein said manually initiated scanner includes
a shaft journaled for rotation about its axis,
means for manually rotating said shaft in one direction a predetermined angular distance from a rest position including a single fingerhole dial member and a finger stop member said finger stop member being spaced from said rest position said predetermined angular distance,
spring motor-governor means coupled to said shaft and loaded during movement of said shaft in said one direction for mechanically returning said shaft to said rest position,
a plurality of switch elements, each of said switch elements being connected to one of said data input devices, respectively,
a rotary member driven by said shaft,
a switch-actuating element driven by said rotary member momentarily actuating each of said plurality of switch elements in sequence to connect said switches to said utilization device in the sequence scanned.

15. The invention defined in claim 14 including
a latch circuit connected to said first of said plurality of switch elements and actuated to one condition by said switch-actuating element with said first of said plurality of switch elements and actuated to another condition upon engagement of said switch elements with the last of said plurality of switch elements,
means connecting said generator so as to render said generator inoperative upon said wiper momentarily engaging the said first of said plurality of contact elements in movement from said rest position and operative upon said wiper element engaging the last of said plurality of contact elements upon complete movement of said shaft in said one direction through said predetermined angular distance,
whereby contact elements intermediate the first and the last of said contact elements are rendered ineffective on movement of said shaft to said predetermined angular position and said contact elements intermediate said first and said last contact elements being rendered effective only on said wiper element engaging the last of said contact elements and rendered operative only on the return movement of said wiper element to return position by said spring motor-governor means.

16. The invention defined in claim 7 including an array of isolation reed relays having switch elements operated thereby, selective actuation of said switch elements determining the selected code pattern generated by said generator, and
the output of said diode matrix being connected directly to said array of isolation reed relays.

* * * * *